Dec. 13, 1927.

H. V. NIELSEN 1,652,994

MACHINE FOR FILLING BOTTLES AND OTHER VESSELS

Filed Dec. 8, 1926

INVENTOR

HEINRICH V. NIELSEN

BY

ATTORNEYS.

Dec. 13, 1927.
H. V. NIELSEN
1,652,994
MACHINE FOR FILLING BOTTLES AND OTHER VESSELS
Filed Dec. 8, 1926   3 Sheets-Sheet 2
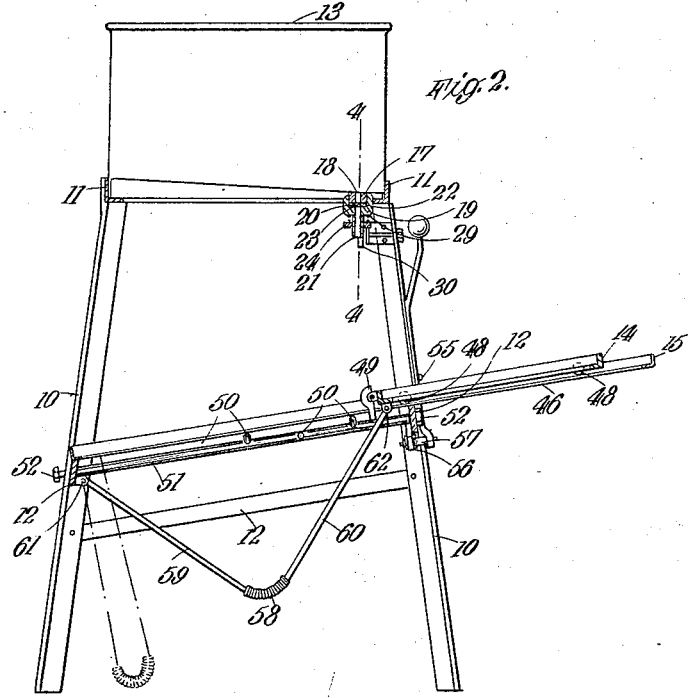
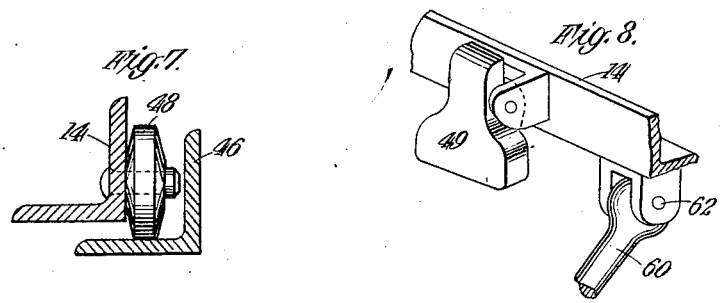
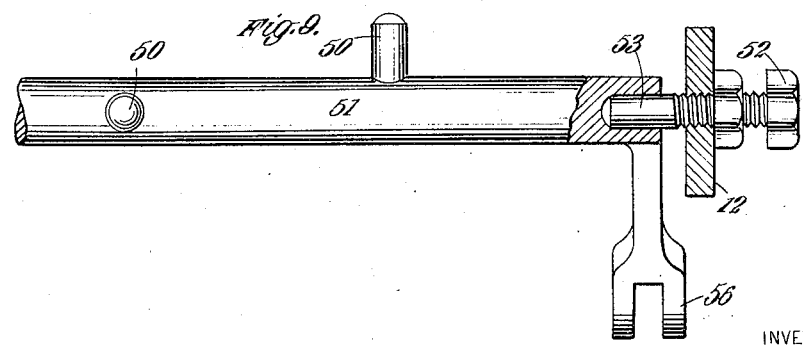
INVENTOR
HEINRICH V. NIELSEN
BY
ATTORNEYS.

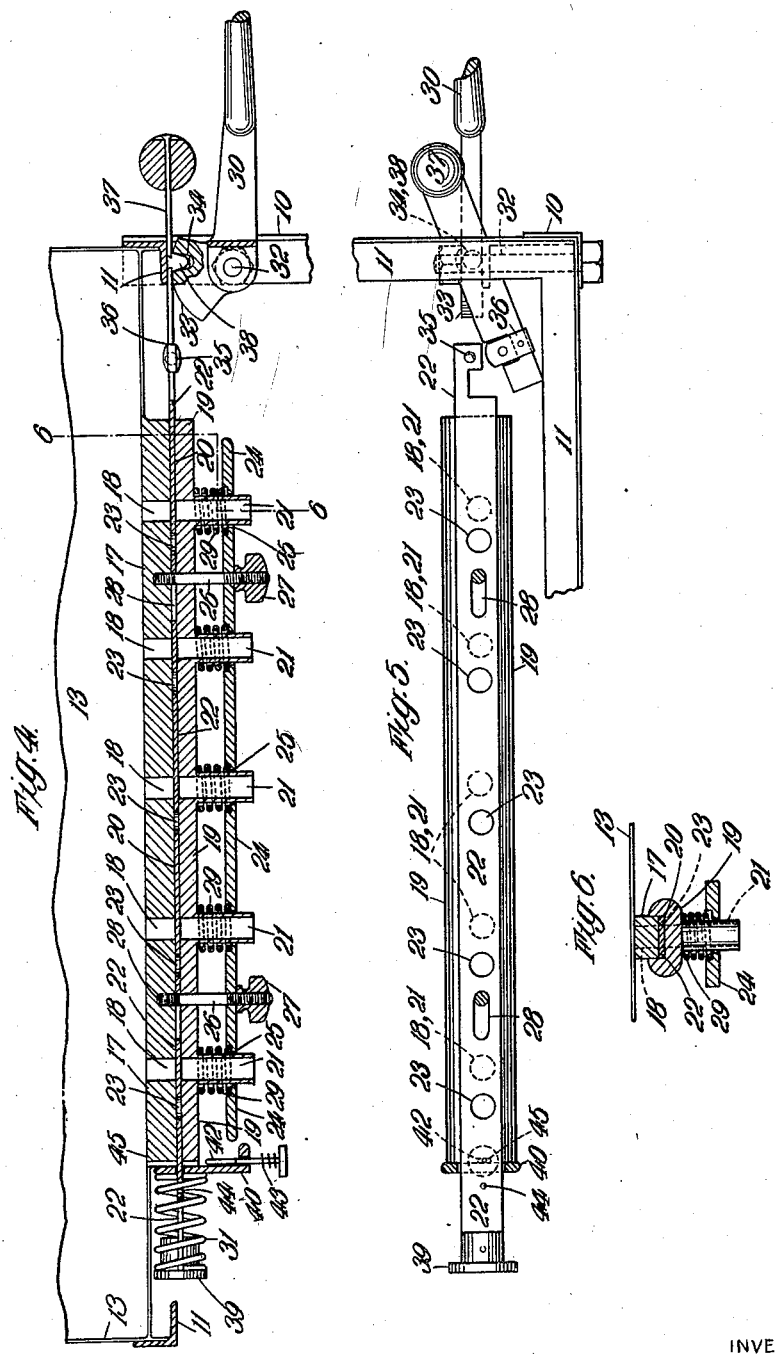

Patented Dec. 13, 1927.

1,652,994

UNITED STATES PATENT OFFICE.

HEINRICH VALDEMAR NIELSEN, OF CARDIFF, WALES.

MACHINE FOR FILLING BOTTLES AND OTHER VESSELS.

Application filed December 8, 1926, Serial No. 153,310, and in Great Britain December 5, 1925.

My invention relates to machines for filling receptacles with liquids, or with comminuted or ground dry materials, the liquids being typifiable by milk and the dry materials by sugar and flour.

A machine embodying the invention is characterized by the combination with a container for the liquid or material to be filled and having openings for the discharge thereof, of mechanism for controlling the discharge while avoiding all forms of joint-making packing, such mechanism comprising a control member mounted in operative relationship with the container, provided with complemental discharge openings, and adapted to be moved in one direction to bring the openings into register to effect the discharge, and in another direction to cut off the discharge.

The control member may be of a single or of a multiple structure. In the latter form, the components are counterpartal, and each is designed to control a predetermined number of openings in the container, the components being independently or simultaneously operated.

A machine incorporating the invention is further characterized in that in some forms of the control member the receptacles to be filled are sequentially assembled on a support which is periodically advanced after a filling until all the receptacles are filled and removed, the support comprising a frame adapted to move gravitationally under the weight of the filled receptacles against an agent which returns the support to the initial position for the next filling operation.

A machine embodying the invention is still further distinguished by the combination of parts constituting the complete machine, these parts being constructed, arranged and adapted to operate substantially as I will now describe with reference to the accompanying drawings which illustrate, by way of example, a milk bottling machine, and whereof:

Fig. 1 is a general front elevation of the complete machine ready for use; and

Fig. 2 is a sectional end elevation thereof on the line 2—2 of Fig. 1; while

Fig. 3 is a plan, looking, approximately, along the line 3—3 in Fig. 1 and assuming the container and the major portion of the controlling mechanism removed.

Fig. 4 is a fragmental detail sectional front elevation on the line 4—4 in Fig. 2; and Fig. 5 is a corresponding plan thereof, parts, however, being assumed removed or broken away for clarity of illustration; while Fig. 6 is a transverse section on the line 6—6 in Fig. 4.

Fig. 7 is a fragmental sectional elevation of a structural detail; and

Fig. 8 is a fragmental perspective view of another such detail; while

Fig. 9 is a sectional elevation of a further such detail; all these details being identified hereinafter.

The same numerals of reference are adopted throughout to designate the same parts.

According to this example, I employ a frame comprising four equally-spaced legs 10—10, and tie-members 11 and 12 applied at the top and intermediate of the ends of the legs 10—10.

The tie-member 11 is appropriately of channel section so as to present a horizontal ledge for the removable reception of a tank 13 into which the milk is poured for delivery for filling into the bottles. The bottles are assembled in a normal way in a case that is positioned in a carrier 14 reciprocably mounted in a frame 15 supported upon the front and rear components of the tie-member 12 which is stiffened by struts 16, 16 connected to the legs 10—10.

The machine exemplified is designed to fill twenty bottles in four operations, that is to say five simultaneously in alignment, consequently they are assembled in the case in five rows of four per row.

The bottom of the tank 13 declines from the rear to the front as will be seen from Fig. 2, and in proximity to the front it is provided with a bar 17 which may be integral therewith, or secured thereto in any suitable way. As is shown best in Figs. 4, 5 and 6, five equi-distant aligned holes 18—18 are made in the bottom of the tank 13 and the bar 17. As a detachable complemental to the bar 17, I provide a bar 19 adapted to embrace it laterally and present a cavity 20 between the adjacent faces. The bar 19 is furnished with five nozzles 21—21 registering with the holes 18—18, hence liquid can flow from the tank 13 by way of the openings 18—18 and nozzles 21—21 into the bottles destined to be positioned below the nozzles. The operative connection between the holes 18—18 and the nozzles 21—21 is controlled by a reciprocable flat member 22 in the form of a slide situated in the cavity 20 between the bars 17 and 19, and having holes 23—23 for co-acting with the holes 18—18 and the nozzles 21—21, the arrangement being such that a liquid-tight metal-to-metal joint is positively maintained between the slide 22 and the bars 17 and 19. This is accomplished by applying below the bar 19 another bar 24 which is formed with openings 25—25 for the passage of the nozzles 21—21, and is secured to the bar 17 by fastening devices each consisting of a screw stud 26 and a nut 27, the stud being screwed into the bar 17 but having plain portions passing through the bars 19 and a slot 28 in the slide 22. The opening 25 in the bar 24 through which the nozzle 21 passes is recessed to form a seat and abutment for one end of a spiral spring 29 applied around the nozzle 21, the other end seating and abutting upon the under side of the bar 19. Preferably, the end of the spring 29 is permanently secured in the recess in the bar 24. Therefore, when the parts are actively associated, the slide 22 is held in spring-pressed contactual relationship with, and between, the bars 17 and 19 preserving liquid tightness without the necessity for flexible packing, while, when the nuts 27, 27 are detached, the bar 19, the slide 22, the bar 24 and the springs 29—29 can be removed and re-applied as a unit as will be more particularly explained presently.

The slide 22 is actuated to bring its holes 23—23 into register with the holes 18—18 in the bar 17 and with the nozzle 21—21 to establish the liquid discharge connection by a lever 30 applied at one end of the slide 22 and designed to work against a spring 31 applied at the other end of the slide. The lever 30 and spring 31 may be arranged in any suitable way, but that illustrated is particularly appropriate and, in consequence, I recommend it inasmuch as it facilitates the unitary arrangement of the slide 22 and its allied parts.

The lever 30 is pivoted at 32 to a leg 10, and it is formed with a head 33 furnished with a cavity or pocket 34 comprising an element in the means for establishing its connection with the contiguous end of the slide 22 in which is secured another element consisting of a ball 35. The ball 35 is destined to co-act with a spring clip 36 associated with a lever 37 furnished with a dowel or projection 38 which normally reposes in the cavity or pocket 34 in the lever 30 and thus constitutes a centre or pivot. Therefore, when the parts are operatively assembled, the slide 22 can be reciprocated by depressing the lever 30, while disengagement can be readily effected by removing the lever 37 as I will explain subsequently.

The spring 31 is positioned upon the slide 22 between an abutment 39 provided on the slide and a bracket 40 loosely suspended from the slide and abutting upon the ends of the bars 17 and 19. The bracket 40 carries a pin 42 which is normally held retracted by a spring 43, but which, at will, is designed to be passed through a hole 44 provided in the slide 22, the ends of the bars 17 and 19 being grooved at 45 for clearance. The pin 42 only functions in the dismantling of the slide 22 and its allied parts which is effected thus:

The lever 30 is depressed to withdraw the slide 22 until the hole 44 registers with the pin 42, and then the pin 42 is pressed into engagement. The lever 30 is now released, and the lever 37 pushed laterally to release the clip 36 from the end of the slide 22 whereupon the lever 37 can be removed although it is not necessary to do so. Finally, the nuts 27, 27 are removed, and thereupon the slide 22 with the spring 31 and bracket 40, and the bars 19 and 24 with the interposed springs 29—29, can be slid over the screws 26, 26 as a unit for removal for cleansing or other purpose, operative re-assembly being attained by the reverse operations.

As previously mentioned, the bottles are positioned in a case which is, in turn, positioned in the carrier 14 supported by the frame 15. The frame 15 comprises a pair of side members or runners 46, 46 which are supported upon the front and rear components of the tie-member 12 so as to decline from the front of the machine, the free ends at the front of the machine being merged together or joined by a cross-piece 47. The carrier 14 is of rectangular formation to agree with the bottle-case, and at each corner, as represented in Fig. 3, a roller 48 is mounted to run on the members or runners 46, 46, Fig. 7 showing the detail arrangement. The rear end of the carrier 14 is, as shown generally in Figs. 1, 2 and 3 and in detail in Figs. 8 and 9, provided centrally with a hinged arm 49 for operating as a stop in conjunction with a series of spaced stationary stops 50—50 provided on a shaft 51 rotatably mounted at the ends in the front and rear components of the tie-member 12, the centre being aligned with a stud 52 screwed into the tie component 12 and having a smooth cylindrical extremity 53 inserted into a corresponding boring in the end of the shaft 51. The shaft 51 is rocked by a hand lever 54 centered at 55 on a leg 10 and connected to an eye 56 on the shaft 51 by a link 57. The stops 50—50 are spaced apart to agree with the spacing of the four aligned bottles in the case.

A spring 58 is interposed between the carrier 14 and the frame 15, the spring being connected at the opposite ends to rods 59 and 60, the rod 59 being turnably connected at 61 to the tie-component 12, and the rod 60 similarly connected at 62 to the rear end of the carrier 14.

The operation is as follows:

The case, with the empty bottles, is placed on the carrier 14 which, under the resulting weight increment, runs forward against the spring 58 until the arm 49 contacts with the first stop 50 in which position the first row of bottles reposes in alignment with the nozzles 21—21, whereupon, through the agency of the lever 30 and the spring 31, the slide 22 is reciprocated first to deliver the milk and then to cut it off when the bottles are filled. Now, the lever 54 is operated to rock the shaft 51 to remove the first stop 50 out of contact with the stop 49 and bring the second stop 50 into the active position to co-act with the stop 49 when the carrier 14 runs forward and thus hold it for the filling of the next row of bottles. When this row is filled, the same operations are repeated for the successive rows, and when the last row is filled the spring 58 and rods 59 and 60 will have taken up the position indicated in dotted lines in Fig. 2. The case, with the full bottles, is now removable at the rear of the machine, and when removed the spring 58 re-acts and returns the carrier 14 to its initial position ready for the next case of empty bottles.

It will now be manifest that I provide for the filling of a plurality of receptacles in a simple and expeditious way involving no separate yieldable joint-packing with their attendant disadvantages; and that the structural details may be variously modified without affecting the scope of my invention, the essential feature of which resides in the control member 22 and its complements.

Also, it will be apparent that the structure of the member 22 is capable of sundry variants to meet different services, and that in some forms the carrier 14 and its allied parts can be dispensed with.

It will be understood that I desire to comprehend within my invention such modifications as may be necessary to adapt it to varying conditions and uses.

What I claim and desire to secure by Letters Patent is:—

1. A bottle filling device comprising the combination with a supporting frame, of a container for the filling material, a member below the container forming a portion of the bottom thereof, the said member being provided with discharge openings, a slidable plate adjacent the said member with openings adapted to register with the discharge openings but normally held out of engagement therewith, a releasable spring pressed locking member for the said plate and held in position by frictional engagement with the plate, a yieldingly supported member adjacent the plate provided with apertures registering with the discharge openings, a second plate secured to the first named member and carrying the yieldingly supported member, discharge nozzles communicating with the discharge openings and extending through the last named plate, the said yieldingly supported member being supported by a spring surrounding each nozzle and resting upon the last named plate, a spring actuated by the release of the said locking member for moving the slidable plate to cause the apertures thereof to disengage with the discharge openings upon the release of the said locking member, whereby the discharge of the filling material from the container is stopped, and a lever for retracting the slidable plate back into normal position.

2. A bottle filling device comprising the combination with a supporting frame, of a container for the filling material, discharge means for the said filling material, the said discharge means comprising discharge openings and nozzles, a slidable plate between the opening and nozzles and normally breaking the connections therebetween, the said plate being provided with apertures adapted to make connection between the discharge openings and nozzles, when the discharging means are in operation, a spring pressed releasable locking member for the said slidable plate normally held in place by frictional engagement with the plate while maintaining the plate in normal operative position, a spring to automatically slide the plate upon release of the said locking member, whereby the apertures of the plate are brought out of register with the discharge openings and nozzles, to stop the discharge of material, means for bringing a selected row of bottles beneath the discharge nozzles, the said means comprising a carrier, and means for returning the bottle carrier to its original position when the filling of the bottles is completed.

In testimony whereof, I affix my signature.

HEINRICH VALDEMAR NIELSEN.